350-377 SR
3/25/86 XR RE 32,099

United States Patent [19]
Hill et al.

[11] E Patent Number: Re. 32,099
[45] Reissued Date of Patent: Mar. 25, 1986

[54] OPTICAL PRINTER

[75] Inventors: Bernhard Hill; Klaus Schmidt; Gerhard Graf, all of Siegen, Fed. Rep. of Germany

[73] Assignee: U.S. Philips Corporation, New York, N.Y.

[21] Appl. No.: 416,838

[22] Filed: Sep. 13, 1982

Related U.S. Patent Documents

Reissue of:
[64] Patent No.: 4,278,981
Issued: Jul. 14, 1981
Appl. No.: 21,127
Filed: Mar. 16, 1979

[30] Foreign Application Priority Data

Mar. 20, 1978 [DE] Fed. Rep. of Germany ..... 2812206

[51] Int. Cl.[4] ..... G01D 9/42
[52] U.S. Cl. ..... 346/108; 350/377
[58] Field of Search ..... 346/107, 108; 350/377

[56] References Cited

U.S. PATENT DOCUMENTS 3,430,212 2/1969 Max et al. ..... 346/108 UX
4,108,537 8/1978 Watson et al. ..... 350/150

FOREIGN PATENT DOCUMENTS 2606596 8/1977 Fed. Rep. of Germany ... 346/107 R
1441157 6/1976 United Kingdom ..... 350/377

OTHER PUBLICATIONS

Kolk, A. J. & M. Olvovic, Increasing the Kerr Magneto-Optic Effect in Thin Films, *Journal of Applied Physics,* Apr. 1963, vol. 15, No. 4, pp. 1060–1061.
Keay, D. & P. H. Lissberger, Longitudinal Kerr Magneto-Optic Effect in Multilayer Structures of Dielectric and Magnetic Films, Optica Acta, 1968, vol. 15, No. 4, pp. 373–388.

*Primary Examiner*—George H. Miller, Jr.
*Attorney, Agent, or Firm*—Robert S. Smith

[57] ABSTRACT

A template to form the characters to be written is placed between the light source and the record carrier. The template is formed as a light-switching mask the switching elements of which can be controlled by a character generator. The switching elements may be arranged separately beside each other or in matrix form in accordance with the fact whether the characters are to be written per line or per page. Printing in color is also possible. The optical printer combines the functions of a printer, a picture memory and a display.

4 Claims, 4 Drawing Figures

OPTICAL PRINTER

Matter enclosed in heavy brackets [ ] appears in the original patent but forms no part of this reissue specification; matter printed in italics indicates the additions made by reissue.

The invention relates to an optical printer having a light source and a template arranged between the light source and a photosensitive record carrier to form the characters to be printed.

It is an object of the invention to provide an optical printer in which neither moving parts or deflectable rays nor high control voltages are necessary and the construction of which has been kept simple.

For that purpose, the printer according to the invention is characterized in that the template is formed as a light-switching mask in integrated thin-film technique and having light-switching elements which can be controlled electronically by a character generator in such manner as to be transparent at will to the light radiated by the light source.

A preferred embodiment is characterized in that the light-switching mask consists of magneto-optical memory layers of predominantly iron-garnet with vapor-deposited conductor track structures and resistive elements for electronically switching according to a thermomagnetic method.

Such an integrated light modulation matrix is disclosed in German Offenlegungsschrift No. 26 06 596. It consists of a regular pattern of light-switching elements which via vapor-deposited conductor tracks and resistive layers are switched purely electronically. With high integration density, line-shaped light-switching components having more than one thousand elements can be constructed.

Embodiments of the invention will now be described in greater detail with reference to the accompanying drawings, in which.

Figure 1:
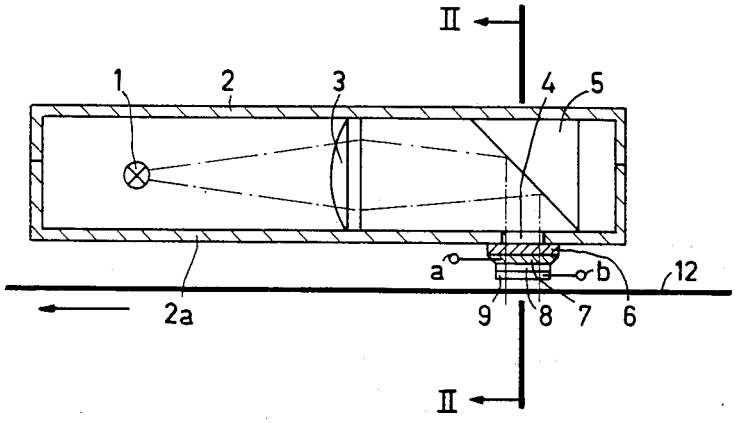
FIG. 1 is a longitudinal sectional view of a part of an optical printer embodying the invention.

The optical printer shown in principle in FIG. 1 comprises a housing 2 in the lower part 2a of which a slot-shaped aperture 4 is provided which covers the full width of the housing 2. The upper part of the housing 2 is detachable so that the components accommodated inside the housing are easily accessible.

A line-shaped line source 1, for example an elongate tubular lamp, is fixedly arranged in the housing 2 and its light is guided via a cylinder lens 3 into the slot-shaped aperture 4 of the housing 2 by a reflecting face of a prism 5. The slot-shaped aperture 4 is covered on its outside by a light-switching mask. The light switching mask consists of a support substrate 6 having a bismuth-doped iron garnet layer. An electrical conductor 7 is vapor-deposited on the iron garnet layer. On the conductor 7 resistive layers 8 are provided on the individual raster points. A further electrical conductor 9 is vapor-deposited on each resistive layer 8. The common conductor 7 is led out and connected to a connection terminal a. The individual electrical conductors 9 have their own connections b1 to bn. A detailed description of such a light-switching mask is to be found in the above-mentioned German Offenlegungsschrift No. 26 06 596.

Figure 2:
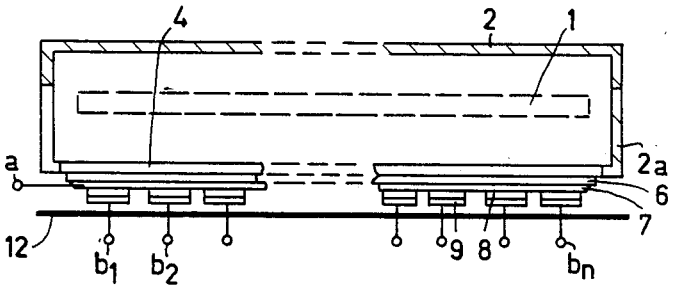
FIG. 2 is a cross-sectional view of the same part, taken through the line 11—11 of FIG. 1.

As shown in FIG. 2, the light-switching elements 7 to 9 are arranged beside each other in a row transverse to the direction of transport of the record carrier 12.

Figure 3:
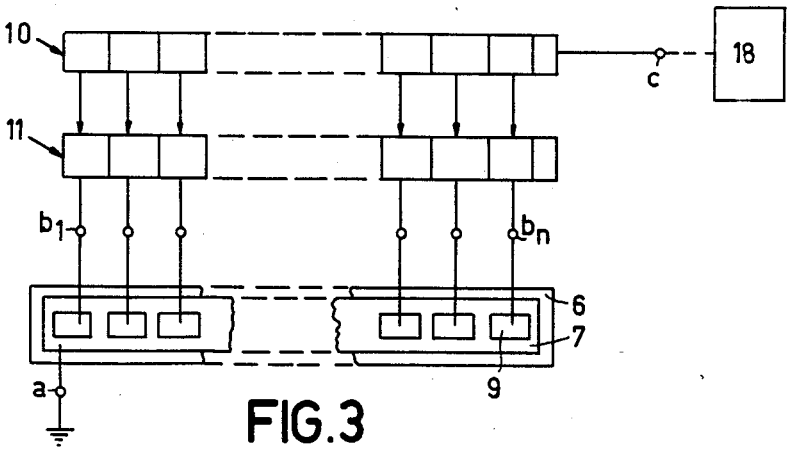
FIG. 3 shows the principle circuit diagram for controlling the light-switching elements of the printer shown in FIG. 1.

The thermal energy necessary to switch each of the light-switching elements 7 to 9 is generated by supplying a short current pulse to the electrodes 7 and 9. The thermal energy generated by the current pulse in the resistive layer 8 is dissipated via the substrate 6. Switching a light-switching element in the generated magnetic field can be carried out in less than one microsecond. The supply of a current pulse is carried out, as shown in FIG. 3, by a character generator 18 the pulse of which are first applied to a shift register 10. After setting said shift register 10 in accordance with the raster points of a line to be written, the associated driver stages 11 are activated in known manner, not shown, which stages themselves again switch the corresponding light-switching elements via the connections b1 to bn. The common electrode 7 is connected to earth potential via the connection terminal a.

In such optical printers it is also possible to use the magneto-optical components for a colored display by a suitable use of the spectral properties of the light-switching elements, as described, for example, in German Offenlegungsschrift No. 27 54 222.

In both recording methods, a grey scale reproduction can be built up digitally with light-integrating recording materials, for example photographic or dry silver paper, by multiple exposure of a line with each time varied light-dark distribution. Because the light-switching elements can operate at very high speed—100,000 switchings are possible per switching element per second, so that in parallel driving of 1,000 elements 100 Mbit/-second can be displayed—high resolving powers of the grey scale can be obtained.

Figure 4:
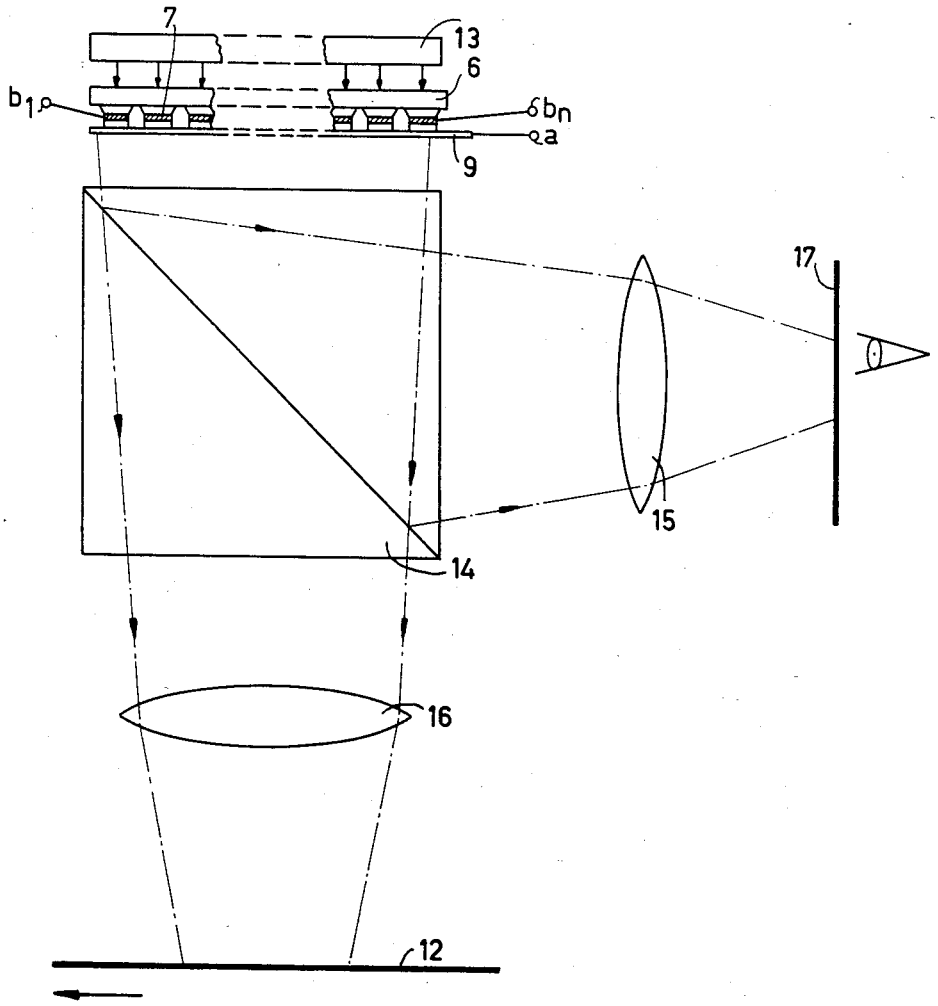
FIG. 4 is a schematic view showing a part of another embodiment of an optical printer embodying the invention.

The use of integrated modulation matrices of high resolving power as a light-switching mask in addition enable further improvements of the optical printing technique. For example, an optical printer can be built up with a light-switching mask having approximately 2,000×2,000 light-switching elements, which printer may be used without mechanically movable components for the exposure of a full sheet of a photosensitive stationary record carrier. FIG. 4 shows such a printer in a simplified form. In this printer a light mask is used having a large number of matrix-like arranged light-switching elements the structural construction of which and the circuit technological control may be derived, for example, from FIGS. 7 and 8 of the German Offenlegungsschrift No. 26 06 596. Over said light-switching mask a uniformly illuminated plate 13 for the constant illumination of all light-switching elements is provided. In this device, electric conductors 7 are provided for each line of the raster and electrical conductors 9 are provided for each column of the raster, the conductors 7 and 9, respectively, extending mutually in parallel and the conductors 7 being provided cross-wise with respect to the conductors 9. The control of the light-switching elements is done in a manner corresponding to that of the control of the apparatus FIG. 3.

For printing a full page, for example, of the format DIN A 4, the picture data provided by the character generator are first stored in the light switching mask, in which the information is supplied at high speed. The record carrier 12 may then be exposed for any period of time by switching on the light source because the characters to be displayed for the full page remain stored in the light-switching mask. The connection of the magnetic memory technique with an optical printer thus permits the combination of the functions of a character memory and the writing in a single apparatus. In the case of multiple exposure in integrated record carriers, a grey scale may also be built up as described above for the line printer.

Since the dimensions of the light-switching mask in most of the cases do not correspond to the dimensions of the page to be written, an optical element 16 is provided between the light switching mask and the record carrier 12 so that a magnification or reduction in size of the stored picture display is carried out. In the case of DIN A 4 sheet formats a magnification will usually be necessary while for printing according to the facsimile method a reduction is desired.

In the device shown in FIG. 4 an extra beam splitter 14 (semi-permeable mirror) is furthermore provided between the light-switching mask and the optical element 16, so that the picture radiated by the light-switching mask is also produced on a screen 17 with the interposition of an optical element 15 so that the page to be written can already be read optically during printing. So a single apparatus combines the functions of printer, picture memory and display. Such apparatus with combined display prove to be suitable especially for the data technology.

The record carriers 12 exposed by the optical printer are then to be developed and fixed in known manner which is not shown. In addition to the use of photosensitive record carriers, the optical printer described for generating light dot patterns may also be combined with optical-electrostatically operating writing methods. For example, the light modulation component of the light-switching elements may be connected to a known writing method with a selenium drum so that any number of copies of the written lines and pages, respectively, can be obtained.

An important application for the optical printer described in addition to the data technology is in the field of the X-ray picture production. Especially in connection with X-ray picture scanners in which the picture information is generated electronically, such optical printers are of great importance for the manufacture of a "hard copy."

The advantages of the optical printer according to the invention as compared with the known optical printer with laser beam or according to the "flying spot" method reside in the very cheap and simple exposure arrangements. Because the light modulation component of the light-switching elements is built up according to an integrated thin-film technique corresponding to semi-conductor technology, the costs of production are low. A further advantage is that the character raster is fixed geometrically so that no drift in the line-shaped exposure can occur. As a result of this a high printing quality is produced.

What is claimed is:

[1. An optical printer which comprises:

a light source, a photosensitive record carrier disposed in spaced relation to said light source, means for forming characters in situ, said means including a character generator, said means being responsive to electronic signals from said character generator, said character generator being disposed between said light source and said photosensitive record carrier, said means for forming including a template which is a light switching mask including means for selectively varying the light transmission through each of a plurality of points, the number of said points being sufficient to provide a high resolution, said means for selectively varying the light transmission including integrated thin-film technology light switching elements and means for controlling said switching elements electronically with a character generator.]

[2. An optical printer as claimed in claim 1 wherein said light switching mask comprises magneto-optical memory layers of predominating iron garnet, vapor-deposited conductor track structures and resistive elements.]

[3. An optical printer as claimed in claim 1 or 2 further including a housing and wherein said light switching mask is placed on the lower side of said housing and covers a slot-shaped aperture therein and the light produced in the housing by the light source is concentrated optically on the full length of said aperture.]

[4. An optical printer as claimed in claim 1 or 2 wherein said light switching mask consists of matrix-shaped light switching elements the number of which corresponds to the number of possible character raster points of a full page, a uniform flat light source disposed above said light switching elements and an optical element to adapt to the writing surface of the record carrier is disposed beneath the light switching elements between said elements and said record carrier.]

*5. An optical printer which comprises:*

*a light source,*

*a photosensitive record carrier disposed in spaced relation to said light source,*

*means for forming characters in situ, said means being responsive to electronic signals from an associated character generator, said means for forming being disposed between said light source and said photosensitive record carrier, said means for forming including a template which is a light switching mask including means selectively varying the light transmission through each of a plurality of points, the number of said points being sufficient to provide a high resolution,*

*said means for selectively varying the light transmission including integrated thin-film technology light switching elements and means for controlling said switching elements electronically with the associated character generator.*

*6. An optical printer as claimed in claim 5 wherein said light switching mask comprises magneto-optical memory layers of predominately iron garnet, vapor-deposited conductor track structures and resistive elements.*

*7. An optical printer as claimed in claim 5 or 6 further including a housing and wherein said light switching mask is placed on the lower side of said housing and covers a slot-shaped aperture therein and the light produced in the housing by the light source is concentrated optically on the full length of said aperture.*

*8. An optical printer as claimed in claim 5 or 6 wherein said light switching mask consists of matrix-shaped light switching elements the number of which corresponds to the number of possible character raster points of a full page, a uniform flat light source disposed above said light switching elements and an optical element to adapt to the writing surface of the record carrier disposed beneath the light switching elements between said elements and said record carrier.*

* * * * *